3,142,583
INORGANIC COATING COMPOSITION
Walter M. McMahon, 796 Avocado Crest Road, La Habre Heights, Calif., and Charles G. Abba, 6914 Pine Ave., Apt. 3, Bell, Calif.
No Drawing. Filed Apr. 5, 1960, Ser. No. 20,027
21 Claims. (Cl. 117—62)

This invention relates to inorganic coating compositions adapted for the protection of metal surfaces, especially ferrous metal surfaces, and more particularly to protective coating compositions composed of finely divided mica such as micronized mica which is dispersed in an inorganic film-forming binder material consisting of finely divided colloidal silica, said silica having a particle size of about 1 to 100 millimicrons. The amount of finely divided or micronized mica present in said composition varies between about 40% to about 200% of the weight of colloidal silica which serves as the film-forming binder material, this amount of mica providing maximum flexibility in the coated film without interfering with the firmly adherent character of the self-insolubilizing colloidal silica binder to the base metal.

The invention also relates to inorganic aqueous coating compositions composed of colloidal silica as an inorganic film-forming binder material, micronized mica as a flexibilizing agent for the colloidal silica film and a metal protecting pigment such as finely divided powdered metal or finely divided metal compound, said metal protecting pigment being present in major proportion with the silica and mica being present in minor proportion. The invention also embraces a method for applying such composition to a surface.

An object of the invention is to provide an aqueous stable inorganic coating composition which can be applied to protect metal surfaces against corrosion which forms a water-insoluble film by evaporation of the aqueous vehicle, said film being of substantial thickness, having good flexibility and exhibiting firm adherence to the base metal.

Heretofore commercially available inorganic coating compositions adapted for the protective coating of metals have been based upon a binder of silicate or of phosphate for the dispersion of metal protective pigment in a film on the metal base. The silicate binders based either on alkali metal silicate or hydrolyzed tetra-alkyl ester of orthosilicic acid are generally unsatisfactory in these coatings due to their water solubility, severely limiting their usefulness to protect the base metal against corrosion in a moisture bearing environment. The phosphate binders based upon alkali metal phosphate for example require a higher degree of control to eliminate abnormal film flow, blistering, loss of adhesion and poor physical characteristics of the film since these binders set by complex chemical reaction between the ingredients and the metal base and these complex chemical reactions are critically dependent upon the selection of ingredients, their proportions and conditions of film application. Accordingly, a high degree of formulating and applying skill are required by both the manufacturer and user.

A further object of the invention is to eliminate the foregoing difficulties with inorganic silicate and phosphate protective coating compositions and thereby provide an inorganic coating composition which is water-insoluble and water resistant, self-insolubilizing by water release and evaporation and which is readily applied as a hard tough film in substantial thickness to protect the metal base yet is sufficiently flexible to withstand mechanical forces of abrasion and impact by reason of its content of colloidal silica and micronized mica.

Another object of the invention is to provide an inorganic flexibilizing and water-insensitive solid thickening medium in the form of micronized mica to enhance a protective film formed from colloidal silica by water release deposited from an aqueous vehicle, the amount of said mica being at least 40% by weight of said silica providing blister free strongly adherent coatings to a metal base protected by said film.

A further object of the invention is to provide a rapid setting inorganic aqueous coating composition becoming water-insoluble by evaporation of the aqueous vehicle and hardened by the action of an aqueous inorganic chloride salt hardening agent to provide methods for application and hardening of protective films applied to a metal surface.

A further object is to provide flexible metal protecting inorganic coating compositions containing cathodically protecting metal pigments and metal coated with said compositions.

Other and further objects of the present invention will appear from the more detailed description set forth below, it being understood that such more detailed description is given by way of illustration and explanation only and not by way of limitation, since various changes therein may be made by those skilled in the art without departing from the scope and spirit of the present invention.

In accordance with the invention, the film-forming binder of the inorganic aqueous protective coating composition consists of an alkali-stabilized colloidal silica in the form of dispersed particles having a particle size of 1 to 100 millimicrons and having the alkali substantially all outside of the silica particles.

The alkali stabilized colloidal is a unique material and does not resemble any other common inorganic colloidal dispersion. A very important property of such a colloidal silica is that the silica is irreversibly precipitated. Once the colloidal silica is dispersed, in water for example, and dried, it cannot be redispersed. Such a colloidal silica is marketed under the trade name "Ludox" by E. I. du Pont de Nemours and Company, under the trade name "Syton" by Monsanto Chemical Company and under the trade name "Nalcoag" marketed by National Aluminate Company.

A number of types of alkali stabilized colloidal silica which may be used are listed as follows:

| Trade Name | Manufacturer | Solids | pH |
|---|---|---|---|
| Ludox HS | Du Pont | 30.0 | 9.8 |
| Ludox LS | do | 30.0 | 8.4 |
| Syton C-30 | Monsanto | 30.0 | 9.8 |
| Syton C-15 | do | 15.0 | 9.8 |
| Nalcoag 1015 | National Aluminate | 15.0 | 8.6 |
| Nalcoag 1030 | do | 30.0 | 10.2 |
| Nalcoag 1035 | do | 35.0 | 8.6 |
| Nalcoag 1050 | do | 50.0 | 9.0 |

The "Ludox" colloidal silica is composed of 29 to 31% $SiO_2$, 2.29 to 0.39% $Na_2O$ and a maximum of 0.15% sulfates as $Na_2SO_4$, and is obtainable in the form of a colloidal dispersion in water containing about 30% solids. The silica particles in "Ludox" colloidal silica are extremely small, ranging from about 0.01 to 0.03 micron in maximum dimension.

It is advantageous to use "Ludox" silica having a particle size of less than 30 millimicrons (0.03 micron), although the particles of "Ludox" may be of colloidal dimensions, that is, particles having an average size not exceeding 100 millimicrons (0.1 micron) nor less than about 1 millimicron (0.001 micron). The particle size of "Ludox" colloidal silica is determined as the average size of particle present when the solution is diluted to about 0.1% $SiO_2$ with water and dried in a very thin layer deposit as described in the patents to the material mentioned below.

"Ludox" colloidal silica and the method of making it is described in detail in U.S. Patent Nos. 2,244,325, issued June 3, 1941; 2,574,902, issued November 13, 1951; and 2,597,872, issued May 27, 1952.

"Ludox" colloidal silicas are generally prepared by passing a silicate through an ion exchange resin to remove the alkali as described in U.S. Patent No. 2,244,325. If all of the alkali is removed from the silicate, the resulting sols are not stable, but they can be stabilized by adding a small amount of alkali such as $Na_2O$ or $K_2O$.

The above patents described "Ludox" colloidal silica as a stable aqueous silica sol generally having a silica-alkali ratio from about 60:1 to about 130:1 containing discrete silica particles, having a molecular weight, as determined by light scattering of more than one-half million. It has a relative viscosity, at 10 percent $SiO_2$, from 1.15 to 1.55 and generally contains from 20 to 35 percent by weight of $SiO_2$. The silica-alkali ratio of "Ludox" silica is calculated at $Na_2O$ and may be as low as 10:1 but it is advantageous to use a "Ludox" silica containing a silica-alkali ratio of between about 60:1 to 130:1. The silica-alkali ratio makes it obvious that the silica and alkali are combined in a special manner not found in conventional metal alkali silicates since the latter cannot be prepared in a form soluble and stable in aqueous solutions at ratios above 4:1. The alkali present is not uniformly distributed throughout the $SiO_2$ particles as it is in conventional silicate such as water glass but is substantially all outside the $SiO_2$ particles. The alkali is present as a stabilizer for the $SiO_2$ sol and prevents condensation of the $SiO_2$ particles. The "Ludox" silica sols could be prepared and used in the absence of alkali but this is not practical because they gel up very rapidly and cannot be stored.

The preparation and properties of the "Nalcoag" colloidal silica are shown in U.S. Patent No. 2,438,230 to Ryznar, issued March 23, 1948.

The corrosion resisting paints of the invention preferably contain less than about 50% by weight of volatile aqueous vehicle and usually about 20% to about 48% of water. More than 50% of the paint by weight consists of mica, colloidal silica binder and the added pigment.

Films may be readily applied to a base by conventional coating procedure, e.g., spraying, dipping, brushing, casting, roller coating, etc. in thicknesses varying from about 2 to about 7 mils, preferably about 3–5 mils in thickness, the films becoming water-insoluble upon normal evaporation of the aqueous vehicle or by evaporation at elevated temperature.

Insolubilization of the coating composition appears to be essentially independent of relative humidity and temperature, occurring at relatively low temperatures, for example 45° F., and the product becoming irreversibly insoluble, apparently due to the packing of the wet particles of colloidal silica into a film which, after moisture evaporation cannot be redispersed in water. Finely divided pigment particles such as zinc dust or zinc oxide having a particle size of 4–6 microns are entrapped in the colloidal silica film, and the colloidal silica effectively packs about the pigment particles while the micronized mica present enhances flexibilization and uniform hardening of the film. Although the film is relatively soft when first formed it continues to harden on ageing. Neither of the soft freshly prepared film nor the hardened aged film are leached or softened by immersion in water.

For added protection of metal surfaces, particularly iron and steel surfaces, metal protective pigments such as zinc dust, powdered lead, aluminum flake or other finely divided metal pigments which are preferably less than 15 microns in particle size, and finely divided insoluble inorganic compounds such as lead oxides (litharge, lead dioxide), lead chromate, zinc oxide, iron oxide, aluminum oxide and mixtures of said metal pigments and said inorganic compounds added in amounts of from 5 to about 10 parts of said metal protective pigment for each part of the colloidal silica binder provide inorganic aqueous protective paints in accordance with the invention.

A new physical coaction between micronized mica, pigment and binder appears to occur as a result of the very fine particle size of the mica. This fine particle size results from comminution of the mica in water to form a pulp providing what is effectively a colloidal dispersion of the mica in water consisting mainly of particles of mica between 0.5 micron and 3 microns in particle size. These mica fines having a particle size in the range of 0.5 to 3 microns provide a thixotropic liquid when mixed with water, thixotropy possibly being due to the hydrophilic surface characteristics of the mica particles and partly due to the colloidal fine grain size.

Mixing of larger particles of pigment with the colloidal size mica is enhanced because of the hydrophilic character of the mica and further because of the fine particle size. The resulting coating is smoother than coatings of the binder and pigment and although slightly softer due to the mica content than the binder-pigment coating, this softness is overcome by ageing and by upwardly adjusting the proportions of the harder pigment ingredient.

It is quite surprising that mica at 50% by weight based on the binder permits the incorporation of from 5 to 10 parts of metal protecting pigment for each part of colloidal silica binder. The inclusion of this amount of pigment completely alters the thickness and hardness characteristics of the applied film without any sacrifice of adhesion or unusual flexibility which is imparted by the substantial amount of colloidal mica present. Mica and binder coatings in accordance with the invention are applied in thickness of about 3 to 4 mils by one-coat application, this thickness being less with finer particle size mica material. With admixture of coarse size particles of mica up to 25 microns in particle size, film thicknesses of up to 5–6 mils are readily obtained by inclusion of pigment, the film thicknesses are substantially increased up to 10 mils. The pigment-free composition as well as the pigmented composition are slightly softer when first applied than when aged for 12 hours or longer.

A novel feature of the invention is to harden the foregoing coatings applied at room temperature by treatment with an aqueous solution of a water soluble inorganic chloride.

The water soluble inorganic chloride salt in aqueous solution is employed to provide immediate hardening of the mica-silica films of the invention with or without added pigment. Such salts include ammonium chloride, sodium chloride, aluminum chloride, potassium chloride, lithium chloride, magnesium chloride, and other water soluble salts, these being useful in the form of saturated solutions or solution containing more than about 10–15% by weight of salt. To facilitate drying of the aqueous hardening solution volatile water miscible solvents may be added such as methanol, ethanol, acetone, etc. In instances where a natural aqueous salt environment comes into physical contact with the coating, as for example, in applying the coating to marine steel structure, ordinary salt sea water provides a beneficial hardening effect. In contrast to commercial phosphate or sodium silicate coatings which are deteriorated by salt solutions, these same salt solutions promote hardness and abrasion resistance so that the films are toughened and hardened without checking or crazing.

The invention is now illustrated in the following examples given by way of illustration and not limitation.

*Example I*

A pigmented coating composition is prepared by mixing the following:

| | Parts by weight |
|---|---|
| Colloidal silica, "Ludox HS," 30% solution, pH 9.8 | 100 |
| Micronized mica, grade C-1000 (particle size) | 15 |
| Zinc dust, particle size 4–6 | 200 |

This mixture contains 70 parts of water and 245 parts of inorganic ingredients, the ratio of zinc dust to colloidal silica binder being 6.66 and the amount of mica being 50% by weight of the colloidal silica on a dry basis.

This coating was applied to a clean sand blasted steel surface in a film thickness of 7 mils by single spray coating application.

The film dried by evaporation of water and as soon as the water dried the film was not removed by dipping the base and coating into water. Upon standing for 24 hours at room temperature the film became harder.

The coating was smooth and did not crack or check, either when freshly applied or upon aging. Comparing the film for its anti-corrosive protective action with galvanized steel and films of commercial alkali phosphate coating known as "Dimetcote" and of hydrolyzed tetraethyl silicate coating known as "Zinkote," the protection afforded by the coating of this example was seen to be fully equivalent to these while the film characteristics were superior to the chemical coatings, particularly in respect to water resistance when freshly applied, saltspray resistance, freedom from pinholes and blistering, freedom from cracking and checking, and film adhesion and film flexibility.

The base coating was overcoated with commercial vinyl resin types of lacquer, containing vinyl chloride-vinyl acetate copolymer, dibutyl phthalate plasticizer, titanium dioxide pigment, toluene and ketone solvents. The overcoating adhered well to the base coating.

After weathering under wet conditions for 3–4 days the freshly coated film developed its maximum toughness and hardness. To develop the hardness immediately after drying, the film is treated with an aqueous inorganic chloride hardening agent, representative solutions being formulated as follows:

(A)

Water _____ 100 parts.
Ammonium chloride _____ 25 parts.

(B)

Water _____ 100 parts.
Sodium chloride _____ Saturated solution.

(C)

Water _____ 50 parts.
Ethyl alcohol _____ 50 parts.
Sodium chloride _____ Saturated solution.

(D)

Water _____ 100 parts.
Aluminum chloride _____ 70 parts.

Each of the above typical hardening solutions whether applied full strength or diluted down to ¼ with water provide a hardening effect at room temperature, this hardening being slightly faster when more concentrated solutions are used with the alcoholic solution of hardening agent C, the drying of the treated film was more rapid. The effectiveness of the hardening action was checked by testing the abrasion resistance of the coating and it was found to be harder than that which was obtained after two days of weathering without treatment with the hardening agent, the test being carried out after the hardening solution has been completely dried. Each of the solutions and compositions of this example, except solution C are completely non-flammable.

*Example II*

This example illustrates use of a red lead pigmented coating applied as a film 3–5 mils in thickness to a clean sandblasted steel surface. The coating is a tightly adherent film which after weathering outdoors for 2–3 days' exposure provides a hard, smooth, tough, water resistant, protective layer.

The formulation is mixed as follows:

| | Parts by weight |
|---|---|
| Colloidal silica as in Example I "Ludox HS" | 100 |
| Micronized mica as in Example I (mica C–1000) | 42.6 |
| Red lead | 100 |

The film is applied by spraying to the steel surface. The amount of micronized mica can be varied widely from a value of about 50% by weight of the weight of the colloidal silica up to about 200% by weight of the colloidal silica, higher amounts of mica giving heavier film thicknesses of about 5–6 mils in thickness.

These films were immediately hardened by applying the hardening solutions of Example I to improve abrasion resistance of the coating.

*Example III*

This example illustrates an acid resistant inorganic coating based upon inclusion of lead pigment having a particle size of about 5–15 microns.

The following were mixed:

| | Parts |
|---|---|
| Binder as in Example I ("Ludox HS") | 100 |
| Mica as in Example I, mica C–1000 | 20 |
| Powdered lead, 4–8 microns | 210 |

A successful acid resistant coating was cast on clean iron pipe and hardened as in Example I.

*Example IV*

This example illustrates a modification of the coating of Example I in which each of the formulating proportions and steps were followed except that an additional amount of 10 parts of finely divided zinc oxide was added. The coating was applied in a film thickness of 7 mils to sandblasted steel and found to exhibit excellent corrosion resistance while being equivalent in each respect in the film properties to the coating of Example I.

*Example V*

This example illustrates an anti-corrosion paint containing lead chromate as the metal protecting pigment. The formulation is as follows:

| | Parts |
|---|---|
| Binder of Example I ("Ludox HS") | 100 |
| Micronized mica (C–1000) | 20 |
| Lead chromate, finely divided, 300–350 microns | 180 |

The coating applied to the surface of freshly sandblasted and cleaned steel in a thickness of 6 mils was hardened by the hardening solution of Example I and provided good protection of the base metal in view of the excellent film characteristics and adhesion, these being fully equivalent to those in Example I.

In the formulations of the foregoing examples fillers and extenders may be included without impairing film characteristics, acid resistance and corrosion protection. For example, up to 5–10% of inert filler such as colloidal bentonite, china clay, amine treated bentonite or fibrous talc may be added to provide thickening of the composition and to produce a lighter weight of coating. Conventional coloring pigments in the usual amount required to provide uniform coloring to provide matched shade and hue may also be added where the coating serves a decorative function.

In instances where special resistance to chemicals are needed, the metal protecting pigments may include finely divided nickel, finely divided chromium and finely divided cobalt, particularly if use of the coating may be at high temperature. Although high temperature plays no part in causing the coating to set or adhere, the utility of the coatings of the invention is not restricted to structures maintained at room temperature and can be heated to temperatures of up to 700° F.

Obviously such metal protecting pigments as red lead, zinc chromate, iron oxide and micaceous iron oxide are also useful in outer coatings applied in paints for protection of outdoor metal structures because of better wearing characteristics of these pigments in combination with the mica-colloidal silica binder of the invention.

The micronized mica is prepared by comminuting minerals of the mica family or synthetic mica (fluorine mica), the minerals including muscovite (potassium mica), phlogopite or biotite (magnesium micas), lepidolite or zinnwaldite (lithium micas), roscoelite (vanadium mica); also oellacherite, fuchsite, mariposite, paragonite, pholidolite, anomite, lepidomelan, manganophyll, ganophyllite, rubellite (rubellan), culsageite, hallerite, philadelphite, polylithionite, taeniolite, margarite, ephesite and others.

These mica minerals may have an appreciable water content such as the hydromicas, e.g., hydromuscovite, leverrierite, guembelite, hydrobiotite, glauconite and seladonite.

The mineral substance is first subjected to heating at a temperature above 100° C. to expel part of the water of crystallization and thereafter the substance is mechanically reduced within a liquid but preferably water. The comminution is effected, for instance, by means of a rapidly rotating hammer mill. Then the particles smaller than one micron may be segregated.

The invention is further defined in the claims which follow.

We claim:

1. An inorganic protective coating composition comprising an aqueous dispersion of micronized mica having a particle size of about 3 to about 10 microns, a finely divided metal protecting pigment, and as a film former for said mica and metal pigment, an alkali-stabilized colloidal silica in the form of dispersed particles having a particle size of 1 to 100 millimicrons and having the alkali substantially all outside the silica particles, there being present about 40% to about 200% of said mica by weight of said silica and about 5 to about 10 parts of said metal protecting pigment for each part of said silica, said metal protecting pigment including finely divided powdered metals and finely divided metal oxides.

2. An inorganic protective coating composition adapted for metal surfaces comprising an aqueous dispersion of micronized mica having a particle size of less than 25 microns to flexibilize said coating, a finely divided metal protecting pigment selected from the group consisting of zinc dust, powdered lead, aluminum flake, zinc oxide, iron oxide, aluminum oxide, lead oxides, lead chromate and mixtures of these, and as the film former for said mica and said metal protecting pigment an alkali-stabilized colloidal silica in the form of dispersed particles having a particle size of 1 to 100 millimicrons and having the alkali substantially all outside the silica particles, there being present about 40% to about 200% of said mica by weight of said silica and from about 5 to about 10 parts of said metal protecting pigment for each part of said silica.

3. A coating composition as claimed in claim 2 wherein said mica is present in an amount varying from 40% to 125% by weight of said silica and said metal protecting pigment is zinc dust of particle size of about 4 to about 6 microns.

4. A coating composition as claimed in claim 2 wherein said mica is present in an amount varying from 40% to 125% by weight of said silica and said metal protecting pigment is powdered lead of particle size of about 4 to about 8 microns.

5. A coating composition as claimed in claim 2 wherein said mica is present in an amount varying from 40% to 125% by weight of said silica and said metal protecting pigment is a mixture of zinc dust of particle size of about 4 to about 6 microns and finely divided zinc oxide having a particle size less than about 15 microns.

6. A coating composition as claimed in claim 5 wherein the amount of zinc dust present in said mixture of zinc oxide and zinc dust varies from about 4% to about 40% by weight of said mixture.

7. An inorganic protective coating composition comprising an aqueous dispersion of micronized mica having a particle size less than 25 microns, finely divided metal protective pigment and as a film former for said mica, an alkali-stabilized colloidal silica in the form of dispersed particles having a particle size of 1 to 100 millimicrons and having the alkali substantially all outside the silica particles, there being present about 40% to about 200% of said mica by weight of said silica.

8. A coating composition as claimed in claim 7, wherein said finely divided pigment is present in an amount by weight of from about 5 to about 10 parts per part of silica.

9. A coating composition as claimed in claim 7, wherein said mica is a mixture of colloidal mica about 0.5–1.0 micron in size and larger particle size mica up to 25 microns in particle size.

10. A method of coating metal surfaces comprising applying an aqueous dispersion of micronized mica having a particle size of less than 25 microns and as the film former for said mica, an alkali-stabilized colloidal silica in the form of dispersed particles having a particle size of 1 to 100 millimicrons and having the alkali substantially all outside the silica particles, there being present about 40% to about 200% of said mica by weight of said silica, and treating said coating with a water solution of a water soluble inorganic chloride hardening agent to harden said coating.

11. A method of coating metal surfaces comprising applying an aqueous dispersion of micronized mica having a particle size of less than 25 microns to flexibilize said coating, a finely divided metal protecting pigment selected from the group consisting of zinc dust, powdered lead, aluminum flake, zinc oxide, iron oxide, aluminum oxide, lead oxides, lead chromate and mixtures of these, and as the film former for said mica and said metal protecting pigment an alkali-stabilized colloidal silica in the form of dispersed particles having a particle size of 1 to 100 millimicrons and having the alkali substantially all outside the silica particles, there being present about 40% to about 200% of said mica by weight of said silica and from about 5 to about 10 parts of said metal protecting pigment for each part of said silica, and treating said coating with a water solution of a water soluble inorganic chloride hardening agent to harden said coating.

12. A method as claimed in claim 10 wherein said chloride is ammonium chloride.

13. A method as claimed in claim 10 wherein said chloride is sodium chloride.

14. A method as claimed in claim 10 wherein said chloride is aluminum chloride.

15. A method as claimed in claim 11 wherein said chloride is ammonium chloride.

16. A method as claimed in claim 11 wherein said chloride is sodium chloride.

17. A method as claimed in claim 11 wherein said chloride is aluminum chloride.

18. A method of coating as claimed on claim 15 wherein said mica is present in an amount varying from 40% to 125% by weight of said silica and said metal protecting pigment is a mixture of zinc dust of particle size of about 4 to about 6 microns and finely divided zinc oxide having a particle size less than about 15 microns.

19. A method of coating as claimed in claim 15 wherein said mica is present in an amount varying from 40% to 125% by weight of said silica and said metal protecting pigment is zinc dust of particle size of about 4 to about 6 microns.

20. A coated metal article provided with a tightly adherent inorganic coating comprising micronized mica having a particle size less than 25 microns, finely divided metal protective pigment and as the film former for said mica, an alkali-stabilized colloidal silica in the form of dispersed particles having a particle size of 1 to 100 millimicrons and having the alkali substantially all outside the silica particles, there being present about 40% to about 200% of said mica by weight of said silica and about 5 to about 10 parts of said metal protecting pigment for each part of said silica, said metal protecting pigment including finely divided powdered metals and finely divided metal oxides.

21. A coated metal article provided with a tightly adherent inorganic coating comprising micronized mica having a particle size of less than 25 microns to flexibilize said coating, a finely divided metal protecting pigment selected from the group consisting of zinc dust, powdered lead, aluminum flake, zinc oxide, iron oxide, aluminum oxide, lead oxides, lead chromate and mixtures of these, and as a film former for said mica and said metal protecting pigment an alkali-stabilized colloidal silica in the form of dispersed particles having a particle size of 1 to 100 millimicrons and having the alkali substantially all outside the silica particles, there being present about 40% to about 200% of said mica by weight of said silica and from about 5 to about 10 parts of said metal protecting pigment for each part of said silica.

References Cited in the file of this patent
UNITED STATES PATENTS

| | | |
|---|---|---|
| 2,384,542 | Fruth et al. | Sept. 11, 1945 |
| 2,440,969 | Nightingall | May 4, 1948 |
| 2,450,327 | Cogan et al. | Sept. 28, 1948 |
| 2,574,902 | Bechtold et al. | Nov. 13, 1951 |
| 2,576,372 | Toulmin et al. | Nov. 27, 1951 |
| 2,576,845 | McDonald | Nov. 27, 1951 |
| 2,614,051 | Buzzell et al. | Oct. 14, 1952 |
| 2,661,438 | Shand | Dec. 1, 1953 |
| 2,803,566 | Smith-Johannsen | Aug. 20, 1957 |
| 2,886,466 | Iler et al. | May 12, 1959 |
| 2,906,649 | Keuth et al. | Sept. 29, 1959 |
| 2,944,919 | Morris et al. | July 12, 1960 |
| 2,998,328 | Munger et al. | Aug. 29, 1961 |

OTHER REFERENCES

Colloid Chemistry of Silica and Silicates, Ralph K. Iler, pp. 197–200.

RCA reference, RCA technical notes cite RCA TN:5c, RCA Laboratories, Princeton, N.J., received by Patent Office December 2, 1957.